United States Patent Office 3,121,734
Patented Feb. 18, 1964

3,121,734
PROCESS FOR PREPARING 1,2-DICYANO-1,2-
DIFLUOROETHYLENE
Stephen Proskow, Wilmington, Del., assignor to E. I. du
Pont de Nemours and Company, Wilmington, Del., a
corporation of Delaware
No Drawing. Filed Dec. 30, 1960, Ser. No. 79,511
2 Claims. (Cl. 260—465.7)

This invention has as its principal objects, the provision of novel fluorine-substituted cyanoethylenes and their method of preparation.

Halogenated cyanoethylenes (e.g., chlorocyanoethylenes) described in the literature have been prepared by successive halogenation and dehydrohalogenation processes applied to cyano-substituted ethanes or ethylenes. However, it is not feasible to prepare analogous fluorine-substituted cyanoethylenes by these methods because the use of elemental fluorine would be involved and it is well known that elemental fluorine is not only hazardous to handle but it also reacts readily with the cyano group itself. Other methods have been developed which are useful in preparing specific types of cyanofluoroethylenes. However, new methods of preparation and new examples of this class of compounds are of technical importance in this field of chemistry.

It has now been discovered that the previously unknown 1,2-dicyano-1,2-difluoroethylenes can be prepared by pyrolysis of a monohalofluoroacetonitrile. The isomeric cis- and trans-1,2-dicyano-1,2-difluoroethylenes and the method of making them are illustrated by the following equation:

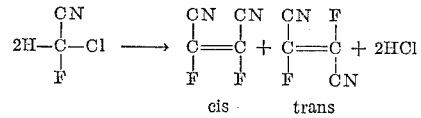

in which Formula I represents a monohalofluoroacetonitrile and X represents fluorine, chlorine, bromine or iodine.

The pyrolysis of a monohalofluoroacetonitrile to obtain 1,2-dicyano-1,2-difluoroethylene, as illustrated by the foregoing equation, is carried out at a temperature in the range of 600–1000° C., preferably in the range of 700–900° C., and usually at atmospheric pressure. However, the pressure is not critical and may be below or above atmospheric pressure. Likewise, since the product is thermally stable, the reaction time is not critical and can be adjusted for maximum benefit at the particular temperature being employed. A diluent is not necessary, but an inert carrier gas such as nitrogen can be conveniently employed to carry the halofluoroacetonitrile into the pyrolysis chamber and to sweep the products out for collection in cold traps maintained at low temperature. The isolated pyrolysis mixture can be fractionated by ordinary distillation.

The material of which the pyrolysis apparatus is constructed is not critical. However, it is advantageous to use apparatus that is resistant to attack by the by-product hydrogen halide produced in the process. Materials that are suitable include glass, copper, nickel, Monel, and nickel-molybdenum-iron alloys.

Halofluoroacetonitriles are obtainable from halofluoroacetamides by a method described by Young and Tarrant, J. Am. Chem. Soc. 71, 2432 (1949).

The invention is illustrated in greater detail in the following example.

EXAMPLE I

*1,2-Dicyano-1,2-Difluoroethylene*

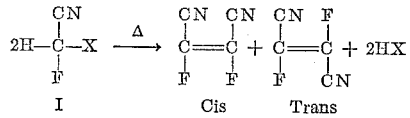

Chlorofluoroacetonitrile (30 g., 0.32 g. mole) was introduced dropwise over a period of 1.5 hours into the upper end of a 0.5" diameter platinum tube inclined at an angle of 30° and heated to 760° C. over a length of 12". The tube was connected at its lower end to a trap cooled to −80° C. by a mixture of solid carbon dioxide and acetone, and a stream of nitrogen was passed through the tube at a flowrate of ca. 200 ml. per minute. The trap-collected product was warmed to room temperature while under water-pump vacuum, and 12 g. of volatile material was obtained which was partly crystalline at −80° C. and completely liquid at room temperature. Distillation of this product yielded 8.3 g. of colorless liquid, B.P. 77–81° C., which was identified by mass spectrum and by infrared and n-m-r analyses as an approximately 1:1 mixture of the cis and trans isomers of 1,2-dicyano-1,2-difluoroethylene.

Analysis for $C_4F_2N_2$:

|  | C | F | N |
|---|---|---|---|
| Calc'd | 42.1 | 33.3 | 24.6 |
| Found | 42.6 | 33.1 | 22.9 |

The product was further characterized by reaction of 2.5 g. (0.022 g. mole) of the above cis-trans mixture with 3.92 g. (0.022 g. mole) of anthracene at 250° C. in a Carius tube. The 1:1 adduct, obtained in 6.3 g. yield, was recrystallized from benzene and formed colorless crystals, M.P. 160–175° C.

Analysis for $C_{18}H_{10}F_2N_2$:

|  | C | H | F | N |
|---|---|---|---|---|
| Calc'd | 74.0 | 3.5 | 13.0 | 9.6 |
| Found | 74.1 | 3.6 | 12.5 | 9.6 |

The fluorine nuclear magnetic resonance data and infrared spectrum were as expected for a cis/trans mixture of 11,12-dicyano-11,12-difluoro-9,10-ethanoanthracene.

The cis- and trans-1,2-dicyano-1,2-difluoro-ethylenes were separated by gas chromatography at 72° C. with helium as a carrier gas at a flow of 50 ml. per minute in a 2 meter column packed with 20% tris-cyanoethyl glyceryl ether on firebrick. Fractions collected at retention times of 7.5 and 9.0 minutes from emergence of air were designated the trans and cis isomers, respectively, on the basis of their distinctive infrared absorption spectra.

The characteristic infrared and n-m-r data are as follows:

| Formula | Infrared Absorption | n-m-r Fluorine Resonance |
|---|---|---|
| cis $\begin{array}{c} CN \quad CN \\ \phantom{C}\diagdown \phantom{C} \diagup \\ C\!=\!C \\ \phantom{C}\diagup \phantom{C} \diagdown \\ F \phantom{CC} F \end{array}$ | C≡N group, strong at 4.5μ. <br> $>C\!=\!C<$, strong at 6.0μ. <br> C—F bonds, strong at ca 9.5μ. | +3,345 c.p.s. relative to F112, at 56.4 megacycles. |
| trans $\begin{array}{c} CN \quad F \\ \phantom{C}\diagdown \phantom{C} \diagup \\ C\!=\!C \\ \phantom{C}\diagup \phantom{C} \diagdown \\ F \phantom{CC} CN \end{array}$ | C≡N group, strong at 4.5μ. <br> C=C, weak at 6.0μ <br> C—F bonds, strong at ca. 9.9μ. <br> Undesignated, moderately strong at 12.1μ. | +4,538 c.p.s. relative to F112, at 56.4 megacycles. |

Crystalline derivatives of the cis- and trans-1,2-dicyano-1,2-difluoroethylenes were obtained by reaction of each with 1,3-cyclohexadiene. The derivative of the cis isomer melted at 118.5–120.5° C., and that of the trans isomer melted at 100–101.5° C.

Analysis for $C_{10}H_8F_2N_2$:

| | C | H |
|---|---|---|
| Calc'd | 61.85 | 4.15 |
| Cis, Found | 61.95 | 4.2 |
| Trans, Found | 62.4 | 4.2 |

In the manner of the foregoing example, the 1,2-dicyano-1,2-difluoroethylenes can be obtained by pyrolysis of difluoroacetonitrile, bromofluoroacetonitrile or fluoroiodoacetonitrile.

The 1,2-dicyano-1,2-difluoroethylenes can be converted to useful derivatives by well known reactions of the cyano group, e.g., hydrolysis to produce the difluoromaleic and -fumaric acids or alcoholysis to yield the corresponding esters, which can be converted to useful polymers as disclosed in U.S. 2,891,968. These difluoromaleic and -fumaric acids, or their esters, are also useful in the preparation of condensation polymers, e.g., by reactions with glycols to form polyesters or by reactions with diamines, for example by the method described in U.S. 2,174,619, to form polyamides.

Since obvious modifications and equivalents in the invention will be evident to those skilled in the chemical arts, I propose to be bound solely by the appended claims.

The embodiments of the invention in which an exclusive property or privilege is claimed are defined as follows:

1. A process of preparing 1,2-dicyano-1,2-difluoroethylene comprising heating a monohalofluoroacetonitrile at a temperature in the range of 600°–1000° C.

2. The process of claim 1 wherein the monohalofluoroacetonitrile is chlorofluoroacetonitrile and the heating is at a temperature in the range of 700°–900° C.

References Cited in the file of this patent

UNITED STATES PATENTS

| | | |
|---|---|---|
| 2,465,318 | Seymour | Mar. 22, 1949 |
| 2,782,218 | Drysdale | Feb. 19, 1957 |

OTHER REFERENCES

Mommaerts: Chemical Abstracts, vol. 40 (1946), p. 4670.